US006820628B2

(12) United States Patent  
Larson

(10) Patent No.: US 6,820,628 B2
(45) Date of Patent: Nov. 23, 2004

(54) OBJECT MANIPULATION APPARATUS

(76) Inventor: Paul Fredolpf Larson, 1412 Gray St., Marquette, MI (US) 49855

( * ) Notice: Subject to any disclaimer, the term of this patent is extended or adjusted under 35 U.S.C. 154(b) by 0 days.

(21) Appl. No.: 10/292,202

(22) Filed: Nov. 12, 2002

(65) Prior Publication Data

US 2004/0089333 A1 May 13, 2004

(51) Int. Cl.⁷ .............................. A45B 3/00; A01B 1/02
(52) U.S. Cl. ............................. 135/66; 135/76; 135/77; 294/55; 294/1.4
(58) Field of Search ............................. 135/65, 66, 72, 135/76, 77, 73; 294/51, 55, 1.3–1.5, 53.5, 57, 58; 15/236.04, 257.7, 257.1

(56) References Cited

U.S. PATENT DOCUMENTS

| | | | | |
|---|---|---|---|---|
| 418,656 | A | * 12/1889 | Robertson et al. ............. | 294/51 |
| 1,183,277 | A | * 5/1916 | Collins ....................... | 294/53.5 |
| 3,374,022 | A | 3/1968 | Tagg | |
| 3,456,663 | A | * 7/1969 | Blum .......................... | 135/66 |
| 4,005,892 | A | 2/1977 | Williams | |
| 4,105,239 | A | 8/1978 | Akczinski, Sr. | |
| 4,562,611 | A | * 1/1986 | Marttinen ................... | 15/257.7 |
| 4,767,141 | A | * 8/1988 | Martin ........................ | 294/50 |
| 4,938,516 | A | * 7/1990 | Temple ...................... | 294/50.9 |
| 5,060,343 | A | * 10/1991 | Nisenbaum .................. | 16/421 |
| 5,392,800 | A | 2/1995 | Sergi | |
| D370,612 | S | * 6/1996 | Meakin et al. ............... | D8/107 |
| 5,640,985 | A | 6/1997 | Snyder et al. | |
| 5,845,664 | A | * 12/1998 | Ryder et al. .................. | 135/65 |
| 5,921,596 | A | * 7/1999 | Sheriff et al. ................. | 294/55 |
| 5,924,434 | A | 7/1999 | Cato, III | |
| 5,975,602 | A | * 11/1999 | Zan ............................ | 294/54.5 |
| 6,254,154 | B1 | * 7/2001 | Herzfeld et al. ........... | 294/53.5 |
| 6,386,216 | B1 | 5/2002 | Cubelli | |
| 6,447,034 | B1 | 9/2002 | Cummings | |

* cited by examiner

Primary Examiner—Winnie Yip
(74) Attorney, Agent, or Firm—Fitch, Even, Tabin & Flannery

(57) ABSTRACT

Apparatus and methods are provided for versatile object manipulation devices that allow a user to manipulate objects. The devices may be used to place an object and to retrieve an object. This is achieved by placing an object retrieval mechanism at one end region of a shaft and placing two or more handles at an opposite end region of the shaft.

17 Claims, 1 Drawing Sheet

OBJECT MANIPULATION APPARATUS

FIELD

The apparatus and methods described herein relate generally to object manipulation devices, and particularly to object manipulation devices having two or more handles allowing for dual handed control of the devices to manipulate objects.

BACKGROUND

Persons having limited mobility often can have difficulty in manipulating objects not directly within their reach. In particular, persons having limited mobility may be confined to a wheel chair and may be not have the ability to move their wheel chair toward where an object is located for manipulating the object with their hands. Even when an object is within reach, persons of limited mobility may not have the dexterity to reach for an object. For instance, when an object is located on a high shelf or on the ground, a person of limited mobility may not be able to reach or to bend to manipulate an object with their hands.

Moreover, typical object retrieval devices can be difficult to operate due to the distance between the handle and the object manipulating device. The long distance between the handle and the object manipulating device can result in control issues, such as accuracy of movement, and particularly can be difficult for manipulating heavy objects. The distance between the handle and the object manipulating device can decrease any mechanical advantage given by the device, and can lead to difficulty in manipulating objects. These difficulties and inaccuracies in the use of such typical object retrieval devices are particularly disadvantageous for those having limited mobility and/or coordination.

A particular type of debris retrieving cane is disclosed in U.S. Pat. No. 4,005,892. The cane includes a single handle at one end and a receptacle means at the opposite end. However, the single handle of the cane can render the receptacle means awkward to use, such as when greater dexterity is desired or when a heavy object is placed in the receptacle means.

Another type of cane device is disclosed in U.S. Pat. No. 5,392,800. The cane includes a single handle at one end and a gripping claw at the other end. The gripping claw uses a complicated transmission cable linkage between the claw and a trigger to selectively shift the gripping claw toward and away from a foot support. The single handle of the cane can render the manipulation of objects with the gripping claw difficult, such as when more precise control of the gripping claw is desired or when heavy objects are grasped by the gripping claw.

Thus, there remains a need for an improved object manipulation apparatus having improved versatility capable of extending the reach of users while providing for improved accuracy and control in the manipulation of objects.

SUMMARY

New improved apparatus and methods are provided for a versatile retrieval apparatus that can be used to manipulate an object. This is achieved by placing an object retrieval mechanism at one end of a shaft and placing two or more handles opposite therefrom.

The object retrieval mechanisms may comprise a scoop. In addition or singularly, the object retrieval mechanism may comprise a magnet. The object retrieval apparatus may be sized to allow the use of the apparatus as cane or walking support.

The apparatus may include an elongate shaft having a first end region and a second end region. A scoop may be affixed to the first end region of the elongate shaft. A primary gripping handle may be attached to the second region of the elongate shaft. To further assist in the manipulation of the object, a secondary gripping handle may be attached to the second end region of the elongate shaft.

The scoop may be configured with a bottom surface for supporting an object. Furthermore, the scoop may have a pair of opposing sidewalls and an end wall extending upwardly from the bottom surface capable of restricting movement of an object on the bottom surface of the scoop. The pair of opposing sidewalls may be inclined upwardly toward the end wall. Each of the inclined portions of the sidewalls may have a notch, and the notches may be aligned with each other from the opposing sidewalls. Thus, an object can be placed in the notch for manipulating the object, such as shifting, retrieving, or placing the object.

A magnet may be attached to the first end region of the elongate shaft in addition to the scoop. The magnet may be positioned opposite the support surface of the scoop. The magnet may be formed of a material selected to resist chipping or scratching when place in contact with the ground. The magnet may be protected by being recessed within a portion of the elongate shaft or by having a collar placed therearound to restrict contact of the magnet with the ground when the apparatus is used as a walking cane.

In one form, the elongate shaft has an intermediate region disposed between the first end region and the second end region. The intermediate region may have an additional handle attached thereto to further assist in the use of the apparatus for manipulating objects.

In one form, the elongate shaft may have a length selected to promote the apparatus to be used as a walking cane. To this end, the handles may be positioned for using the apparatus as a walking cane. In addition, the scoop and/or magnet may be configured to reduce interference therebetween with the ground when the apparatus is used as a walking cane.

In another aspect, a method of retrieving an object is provided. The method may include providing an elongate shaft having a first end region and a second end region. The method may further include extending the first end region of the elongate shaft towards an object by using a either or both of primary and secondary gripping handles attached to a second end region of the elongate shaft opposite the first end region. The method further comprises manipulating the first end region of the elongate shaft using at least one of the gripping handles to place the object within a scoop attached to the first end region of the elongate shaft. Next, the method includes retracting the first end region of the elongate shaft to permit removal of the object from within the scoop using a at least one of the gripping handle attached to the second end region of the elongate shaft.

In another aspect, the method may include the step of retracting the first end region of the elongate shaft by controlling the elongate shaft using a control handle attached to an intermediate region of the elongate shaft disposed between the first end region and second region thereof. The method may also include the step of manipulating the first end region of the elongate shaft by directing the object onto a support surface of the scoop for supporting the object. The step of retracting the first end region of the elongate shaft may include confining the object relative to a pair of opposing sidewalls and an end wall upstanding from the support surface of the scoop. In a particular form of the method, the elongate shaft and the push gripping handle may be used as a walking cane. To this end, the elongate shaft may have a length selected to permit use of the walking cane. The scoop may include a pair of opposing sidewalls and an end wall. The opposing sidewalls may be inclined toward the end wall and have a pair of aligned notches. The step of manipulating the first end of the elongate shaft may include sliding an object along the inclined sidewalls and into the aligned notches.

In yet another aspect, a method of placing an object is provided. The method may include providing an elongate shaft having a first end region and a second end region. The method may further include retracting the first end region of the elongate shaft by using at least one of primary and secondary gripping handles attached to a second end region of the elongate shaft to permit placement of an object within a scoop attached to the first end region of the elongate shaft. The method may further include extending the first end region of the elongate shaft by using at least one of the primary and secondary gripping handles. The method may also include manipulating the first end region of the elongate shaft using at least one of the gripping handles for removing the object from with the scoop.

In another aspect, the apparatus comprises an elongate shaft having a first end region and a second end region. Object manipulation means are attached relative to the first end region of the elongate shaft. First and second gripping handle means are attached to the second end region of the elongate shaft.

DETAILED DESCRIPTION

Figure 2:
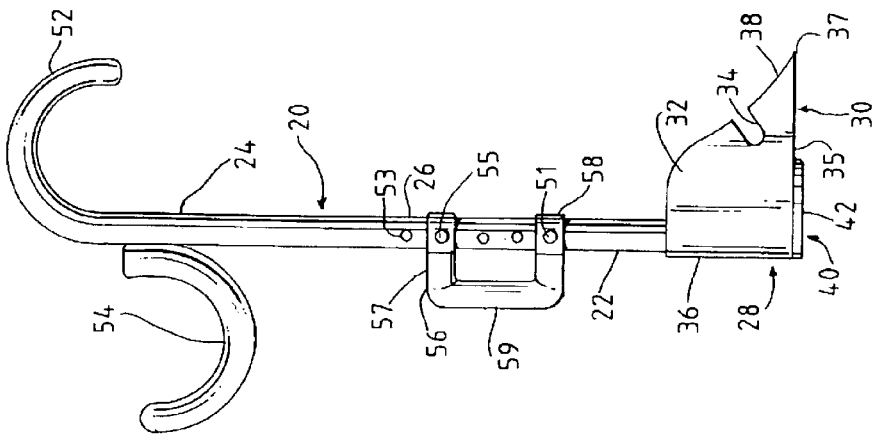
FIG. 2 is a side elevation view of the object manipulation apparatus of FIG. 1.
Figure 1:
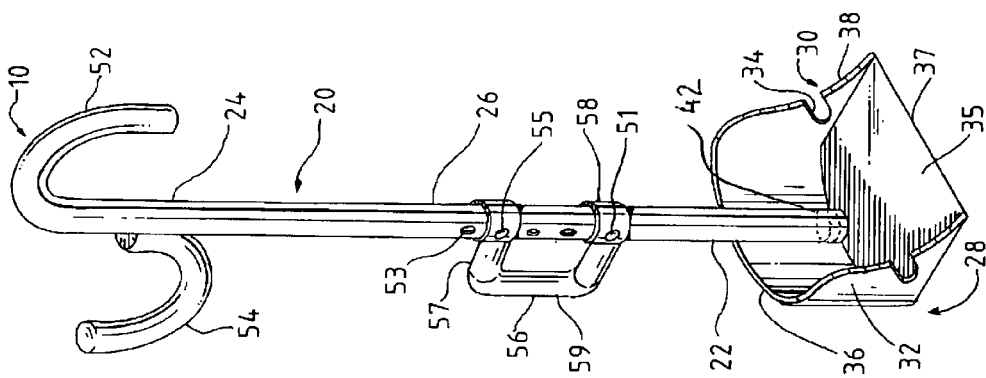
FIG. 1 is a perspective view of an embodiment of an object manipulation apparatus.

As shown in the drawings for purposes of illustration, there are illustrated an embodiment of an object manipulation apparatus in FIGS. 1 and 2. The object manipulation apparatus 10 shown is for manipulating an object, including placing an object and retrieving an object. At one end of the object manipulation apparatus 10, an object manipulation mechanism 28 is provided. At an opposite end of the object manipulation apparatus 10, two or more handles 52 and 54 are provided to allow for improved control of the object manipulation mechanism 28 and thus the object manipulation apparatus 10.

The object manipulation apparatus 10 comprises an elongate shaft 20 having a first end region 22 and a second end region 24 opposite the first end region 22, as illustrated in FIGS. 1 and 2. Attached to the first end region 22 of the elongate shaft 20 is the object manipulation mechanism 28. The object manipulation mechanism 28 may comprise a scoop 30, a magnetic device 40, or other suitable devices for moving and/or retrieving objects. The object manipulation mechanism 28 may include a combination of suitable devices, such as a scoop 30 in combination with a magnetic device 40. Attached to the second end region 24 of the elongate shaft 20 are two or more handles 52 and 54. The use of two or more handles 52 and 54 provides for improved control of the object manipulation mechanism 28 and thus improved control of an object to be manipulated by the object manipulation apparatus 10, as will be described in more detail hereinbelow.

Attached relative to the first end region 22 of the elongate shaft 20 is a scoop 30 for receiving objects, as illustrated in FIGS. 1 and 2. The scoop 30 is configured to allow both for placement of an object therein and for removal of an object therefrom. To this end, the scoop 30 comprises a bottom support surface 35 for selectively supporting the object. The bottom support surface 35 of the scoop 30 is surrounding on three of its four sides by upstanding walls 32 and 36 for constraining movement of an object supported by the bottom support surface 35. More particularly, the upstanding walls 32 and 36 comprise a pair of opposing side walls 32 and an end wall 36 extending therebetween. Opposite the end wall 36 is a lip 37 allowing for an object to be inserted into or withdrawn from within the confines of the opposing side walls 32 and the end wall 36.

Also attached relative to the first end region 22 of the elongate shaft 20 is a magnetic device 40 for use in manipulating objects, and in particular for use in manipulating metallic objects. The magnet device 40 comprises a magnet 42 attached to the bottom surface 35 of the scoop 30 opposite the upstanding walls 32 and 36 thereof. Alternatively, the magnet 42 may be attached to the elongate shaft 20, although other suitable attachment points for the magnet 42 are suitable.

As discussed above, two handles 52 and 54 are located at the second end region 24 of the elongate shaft 20 opposite the first end region 22 of the elongate shaft 20 having the scoop 30 attached thereto. The provision of the two handles 52 and 54 allows for two-handed use of the object manipulation apparatus 10, thereby permitting more accurate control of the object manipulation mechanism 28, such as the scoop 30 or the magnetic device 40, located at the opposite end region 22 of the elongate shaft 20. The use of the two handles 52 and 54 also allows for one of the handles 52 to be configured for pushing the object manipulation mechanism 28 away from the user and the other of the handles 54 to be configured for pulling the object manipulation mechanism 28 toward the user, although both handles 52 and 54 may also have the same configuration and may be used interchangeably or in combination for both pushing and pulling the object manipulation mechanism 28 relative to the user.

In a preferred embodiment of the apparatus, the push handle 52 is integrally formed with the elongate shaft 20. However, the push handle 52 may be separately attachable to the second end region 24 of the elongate shaft 20. The pull handle 54 is preferably a separate member from the elongate shaft 20 and is attached to the elongate shaft 20 below the push handle 52 and toward the scoop 30. However, the pull handle 54 may be integrally formed with the elongate shaft 20 and attached thereto above the push handle 52 and away from the scoop 30.

In the illustrated embodiment of FIGS. 1 and 2, the push and pull handles 52 and 54 comprise generally hook-shaped, semi-circular members. However, other types of handle shapes are equally suitable. In a particular aspect of the apparatus, the generally hook-shaped handles 52 and 54 can be used for manipulating objects. For example, a user can grasp the first end region 22 of the elongate shaft 20 and hook one of the handles 52 or 54 around an object or abutting an object for manipulation thereof. In particular, the hook-shaped handles 52 and 54 can be used for opening and closing barriers, such as doors or cabinets, by either grasping side edges thereof or handles thereon, thereby providing for increased versatility of the object manipulation apparatus.

In a particular aspect of the object manipulation apparatus 10, a control handle 56 is attached to an intermediate region 26 of the elongate shaft 20 to assist in control of the object manipulation mechanism 28. Due to the distance from the first end region 22 to the second end region 24 of the elongate shaft 20, manipulation of the object manipulation mechanism 28 may be difficult in some circumstances, such as when a heavy object is within the scoop 30 or magnetically held by the magnetic device 40, or when more precise control is desired. To address these potential control concerns, the control handle 56 can be used to provide additional support and to further assist in controlling the object manipulation mechanism 28, as will be described more fully hereinbelow.

The control handle 56, in a preferred form, comprises a generally U-shaped handle element having upper and lower ends 57 connected by a cross member 59, as illustrated in FIGS. 1 and 2. Each of the upper and lower ends 57 of the control handle 56 have aligned transverse openings 58 for receiving the intermediate region 26 of the elongate shaft 20. When the elongate shaft 20 is received within each of the openings 58 of the upper and lower ends 57, bolts 55 can be passed through apertures 51 formed in the upper and lower members 57 to secure the control handle 56 to the elongate shaft 20. Apertures 53 are also provided in the elongate shaft 20 to allow the bolts 55 to pass therethrough. Multiple apertures 53 may be provided along the elongate shaft 20, allowing for the location of the control handle 56 to be adjusted according to user preferences. For example, a user having a longer arm span may desire to have the control handle 56 positioned closer to the object manipulation mechanism 28. Conversely, a user having a short arm span may desire to have the control handle 56 positioned closer to the push and pull handles 52 and 54. Although particular configurations of the intermediate control handle 56 are described hereinabove, other configurations of the control handle 56 can be equally suitable.

Turning to more of the details of the scoop 30, the pair of opposing side walls 32 of the scoop 30 are configured for holding an elongate object therebetween in a preferred embodiment of the object manipulation apparatus 10. More particularly, the side walls 32 of the scoop 30 are inclined from the lip 37 toward the end wall 36 and have generally outwardly facing inclined surface edges 38. Each of the inclined side walls 32 includes a notch 34, as shown in FIGS. 1 and 2. The notches 34 in the inclined sidewalls 32 are aligned for holding the elongate object therebetween. The sidewalls 32 are preferably spaced apart a distance less than the length of a typical writing utensil, such as an ink pen or a pencil, and the notches 34 have a depth selected for accommodating a typical writing utensil. To remotely place an elongate object in the notches 34, the lip 37 of the scoop 30 can be placed adjacent to the object and the object directed along the inclined surfaces 38 of the sidewalls 32 and into the notches 34. For close use of the notches 34, the elongate object can simply be placed within the notches 34. To remove the elongate object from the notches 34, the scoop 30 can simply be oriented so that the open side of the notches 34 are facing generally downward to allow the object to fall from within the notches 34. Alternatively, the scoop 30 can be orientated so that the elongate object is allowed to fall from the notches 34 and roll or slide down the inclined surfaces 38 of the sidewalls and past the lip 37 of the scoop 30.

In a particular aspect of the scoop 30, the scoop 30 or a portion thereof may be pivotable relative to the elongate shaft 20 for securing an object therein. For example, the entire scoop 30 can be pivotable toward the elongate shaft 20 to secure an object therebetween In another example, a hinged portion of the scoop 30 proximate the lip 37 may be pivotable between an open position, allowing an object to enter and exit from within the scoop, and a closed position, providing for a fourth upstanding wall of the scoop 30 to secure an object therein.

Turning to more of the details of the magnetic device 40, the magnet 42 preferably is formed of a material resistant to chipping and/or scratching, allowing the magnet 42 to repeatedly come into contact with the ground when the object manipulation apparatus 10 is used as a walking implement. For example, if the object manipulation apparatus 10 is used as a cane and the magnet 42 is disposed to frequently contact the ground, the magnet 42 may repeatedly come into contact with rough surfaces, such as concrete or pavement. To alleviate potential damage to the magnet 42 that may hinder its effectiveness in manipulating objects, the magnet 42 material is preferably selected to be resistant to marring. In another aspect of the object manipulation apparatus 10, the magnet 42 may be partially recessed within the elongate shaft 20 to allow for use of the magnet 42 to manipulate objects while substantially restricting repeated contact between the magnet 42 and the ground.

Turning to a preferred construction of the object manipulation apparatus 10, the elongate shaft 20 is formed of a lightweight hollow member. The hollow member may comprise aluminum or other lightweight metals, although a suitably rigid polymer material may also be used. The hollow member used for the elongate shaft may have an outer diameter between about 0.50 inches and about 1.5 inches, and preferably has an outer diameter of about 0.375 inches.

The push, pull and control handles 52, 54 and 56 may be formed of the same materials as the elongate shaft 20. The handles 52, 54, and 56 may also include non-slip gripping portions, such as plastic or rubber sleeves, providing for improved grasping thereof by a user. Alternatively or in combination, the surfaces of the handles 52, 54 and 56 may be configured with ridges or depressions to provide for improved gripping by a user. The scoop 30 may be formed of a polymer in order to minimize the weight thereof. The scoop 30 may be injection molded. Although particular materials and manufacturing processes are described hereinabove, other suitable manufacturing processes and materials may be equally suitable.

The elongate shaft 20 has a length preferably selected to allow the object manipulation apparatus 10 to be used as a walking aid, such as a cane. More particularly, the length of the elongate shaft may be between about two feet and five feet in length, and is preferably about three feet in length. One or more of the handles 52, 54, and 56 may be positioned along the elongate shaft 20 for a user to grasp while using the object manipulation apparatus 10 as a walking aid. Preferably, the push handle 52 is positioned along the elongate shaft 20 for a user to grasp when the object manipulation apparatus 10 is used as a walking aid. In another aspect of the object manipulation apparatus 10, the handles 52, 54, and 56 may be positioned and the length of the elongate shaft 20 selected to allow the apparatus 10 to be used as a crutch.

The length of the elongate shaft 20 may be adjustable. For example, the length may be adjustable such as by having two or more elements comprising the elongate shaft 20 telescopingly slidable relative to each other to either increase or decrease the length thereof. Having an adjustable length of the elongate shaft 20 can advantageously allow for an increased reach of the apparatus 10. That is, an increased length of the elongate shaft 20 can allow a user to manipulate an object at an increased distance compared to a non-adjustable length shaft 20. An adjustable length elongate shaft 20 may also be advantageously used to allow for adjustments according to user preferences and user height when the object manipulation apparatus 10 is used as a walking aid.

The length of the elongate shaft may be adjustable by telescopingly sliding the two elements relative to each other. A variety of interlocking mechanisms may be used to engage the sliding elements relative to each other to restrict their further relative movement. Friction engagement may be used, such as a tightening nut disposed on threads at the end of one of the members to tighten the opening around the other of the members. Positive engagement may also be used, such as outwardly biased spring loaded pin that is biased outwardly from within the inner of the members and into apertures formed in the outer of the members. Pushing the pins inwardly can allow the members to telescopingly slide relative to one another until engagement is desired. The user may simply grasp the inner and outer members to adjust the length of the shaft 20, or may use the control handle 56 to slide the members relative to one another.

In another aspect of the object manipulation apparatus, the positions of the push and pull handles 52 and 54 along the elongate shaft may be adjustable. As has been described above, the position of the control handle 56 may be adjustable according to the preferences of the user. Similarly, the positions of the push and pull handles 52 and 54 may be adjustable to allow for the user to customize the functionality of the object manipulation apparatus 10.

The manipulation of objects generally involves using the object manipulation apparatus 10, and in particular one or more of the handles 52, 54, and 56 and/or the object manipulation mechanism 28 for shifting of objects from one position to another. For example, an object may be moved from one surface to another surface, or moved to a different position on the same surface using the object manipulation apparatus 10. In another example, a door may be shifted between open and closed positions using the object manipulation apparatus 10, as discussed above. Manipulating an object may involve placing an object on a surface, such as from within the users grasp, or retrieving an object from a surface, such as to allow the user to remove the object from the object manipulation mechanism.

In accordance with a method of using the object manipulation apparatus, the apparatus can be used to retrieve an object. The method includes providing an elongate shaft 20 having a first end region 22 and a second end region 24. The method further includes extending the first end region 22 of the elongate shaft 20 to the object by using one or both of a push handle 52 and/or a pull handle 54 attached relative to the second end region 24 of the elongate shaft 20. Using either or both of the handles 52 and 54, an object retrieval mechanism 28 attached to the first end region 22 of the elongate shaft 20 can be manipulated to generally secure the object relative thereto. Once the object is within the scoop 30, the first end region 22 of the elongate shaft 20 can be retracted using one or both of the handles 52 and 54 to permit removal of the object from within the scoop 30.

In accordance with another method of using the object manipulation apparatus, the apparatus can be used to place an object. The method includes providing an elongate shaft 20 having a first end region 22 and a second end region 24. The method further includes retracting the first end region 22 of the elongate shaft 20 toward a user by using one or both of a push handle 52 and/or a pull handle 54 attached relative to the second end region 24 of the elongate shaft 20 to permit the object to be secured relative to an object manipulating mechanism 28 attached to the first end region 22 of the elongate shaft 20. Using either or both of the handles 52 and 54, the scoop 30 can be extended away from the user and the scoop 30 manipulated to discharge the object therefrom.

In a particular embodiment of the methods of retrieving and placing an object, the push handle 52 can be used for extending the object manipulation mechanism 28 of the first end region 22 of the elongate shaft 20. The pull handle is used for retracting the object manipulation mechanism 28 to permit either removal or insertion of the object relative to the object manipulation mechanism 28. However, the push handle 52 and the pull handle 54 may alternatively be used for retracting and extending, respectively.

In a preferred aspect of the method of using the apparatus 10, the push and pull handles 52 and 54 are both used for extending and retracting the first end region 22 of the elongate shaft 20. The use of two or more handles, such as two or more of handles 52, 54, and 56, for manipulating the object manipulating mechanism 28 of the first end region 22 of the elongate shaft 20 allows for two handed control thereof by a user. Two-handed control of the object manipulation mechanism 28 can provide more accuracy in manipulation and can allow for heavier objects to be manipulated. For example, persons having limited mobility may have also have reduced arm strength and/or coordination. The provision of two or more handles 52, 54, and 56 for grasping by a can advantageously permit a person of limited arm strength to more accurately control the object manipulation mechanism 28 and to manipulate heavier objects.

In both the method of placing an object and the method of retrieving an object described hereinabove, the object manipulating mechanism 28 may comprise a scoop 30 or a magnetic device 40, as described hereinabove in greater detail. In a particular form of the method of using the apparatus 10, the object manipulating mechanism 28 may comprise the combination of the scoop 30 and the magnetic device 28. In an aspect of the method of using the apparatus 10, a control handle 56 attached relative to an intermediate region 26 of the elongate shaft 20 may be used for extending, retracting, and/or manipulating the object manipulation apparatus 10.

The aforementioned object manipulation apparatus 10 and methods are suitable for use by a person having limited mobility to manipulate objects. For example, the apparatus 10 and methods may be used by a person confined to a wheel chair or otherwise having limited use of their legs to place and retrieve objects, and in particular to place and retrieve objects from locations beyond their reach. In this manner, the effective reach of limited mobility persons can be increased using the versatile object manipulation apparatus 10 and methods described hereinabove. The apparatus 10 and methods may also be used for persons, while having use of their legs, are restricted in their reach, such as having difficulty in bending over to pick up objects or as having difficulty in walking. In such instances, the apparatus and methods described herein can advantageously provide for assistance in walking and for an additional reach in manipulating objects while limiting unnecessary or difficult movements by the user.

As can be appreciated from the above description of FIGS. 1 and 2, there is provided new improved methods and apparatus for manipulating an object. An object manipulation apparatus 10 having an object manipulation mechanism 28 at one end region 22 of an elongate shaft 20 can be manipulated using two or more handles 52, 54, and 56 located at another end region 24 of the elongate shaft 20. The object manipulation mechanism 28 may comprise a scoop 30 and/or a magnetic device 40 for use in manipulating an object.

While there have been illustrated and described particular embodiments of an object manipulation apparatus and methods for using an object manipulation apparatus, it will be appreciated that numerous changes and modifications will occur to those skilled in the art. It is intended in the appended claims to cover all those changes and modifications which fall within the true spirit and scope thereof.

What is claimed is:

1. An apparatus for manipulating objects, the apparatus comprising:
    an elongate shaft having a first end region and a second end region;
    a scoop affixed to the first end region of the elongate shaft, the scoop having a pair of inclined opposing side walls and an end wall extending upwardly from the bottom surface capable of restricting movement of an object on the bottom surface, the pair of opposing sidewalls being inclined upwardly toward the end wall, each sidewall having a notch, and the pair of notches being aligned for supporting an object therebetween;
    a primary gripping handle attached to the second end region of the elongate shaft; and
    a secondary gripping handle attached to the second end region of the elongate shaft.

2. An apparatus in accordance with claim 1, where in a magnet is attached to the first end region of the elongate shaft.

3. An apparatus in accordance with claim 2, wherein the magnet is positioned opposite the support surface of the scoop.

4. An apparatus accordance with claim 3, wherein the magnet is at least partially recessed within the elongate shaft.

5. An apparatus in accordance with claim 1, wherein the elongate shaft has an intermediate region disposed between the first end region of the second end region, the intermediate region having a control handle attached thereto.

6. An apparatus in accordance with claim 1, wherein the elongate shaft has length selected to permit the apparatus to be use as a walking cane.

7. An apparatus for manipulating objects in accordance with claim 1, wherein the notches are positioned at an acute angle relative to a longitudinal axis of the elongated shaft.

8. A method of retrieving an object, the method comprising:
    providing a elongate shaft having a first end region and a second end region;
    providing a scoop attached to the first end region of the elongate shaft, the scoop having a pair of inclined opposing side walls each having a notch being aligned with the notch on the other of the opposing sidewalls for supporting an object therebetween;
    extending the first end region of the elongate shaft to the object by using a push gripping handle attached to a second end region of the elongate shaft;
    manipulating the first end region of the elongate shaft using the push gripping handle to place the object within the notches of the scoop attached to the first end region of the elongate shaft; and
    retracting the first end region of the elongate shaft to permit removal of the object from within the notches of the scoop using a pull gripping handle attached to the second end region of the elongate shaft.

9. A method in accordance with claim 8, wherein the step of retracting the first end region of the elongate shaft includes controlling the elongate shaft using a control handle attached to an intermediate region of the elongate shaft between the first end region and second end region thereof.

10. A method in accordance with claim 8, wherein the step of manipulating the first end region of the elongate shaft includes directing an object onto a support surface of the scoop for supporting the object and the step of retracting the first end region of the elongate shaft includes confining the object relative to the pair of opposing sidewalls and the end wall upstanding from the support surface of the scoop.

11. A method of retrieving an object in accordance with claim 8, including using the elongate shaft and the push gripping handle as a walking cane, the elongate shaft having a length selected to permit use as a walking cane.

12. A method of retrieving an object in accordance with claim 8, wherein the step of manipulating the first end of the elongate shaft includes sliding an object along the inclined sidewalls and into the aligned notches.

13. A method of placing an object, the method comprising:
    providing a elongate shaft having a first end region and a second end region;
    providing a scoop attached to the first end region of the elongate shaft, the scoop having a pair of inclined opposing side wails each having a notch being aligned with the notch on the other of the opposing sidewalls for supporting an object therebetween;
    retracting the first end region of the elongate shaft to permit placement of the object within the aligned notches of the scoop using a pull gripping handle attached to the second end region of the elongate shaft;
    extending the first end region of the elongate shaft toward the object by using a push gripping handle attached to a second end region of the elongate shaft; and
    manipulating the first end region of the elongate shaft using the push gripping handle to remove the object from within the aligned notches of the scoop attached to the first end region of the elongate shaft.

14. A method In accordance with claim 13, wherein the step of extending the first end region of the elongate shaft includes controlling the elongate shaft using a control handle attached to an intermediate region of the elongate shaft between the first end region and second end region thereof.

15. A method in accordance with claim 13, wherein the step of manipulating the first end region of the elongate shaft includes directing an object from a support surface of the scoop for removing the object from the scoop.

16. A method of placing an object in accordance with claim 13, including using the elongate shaft and the push gripping handle as a walking cane, the elongate shaft having a length selected to permit us as a walking cane.

17. An apparatus for manipulating objects, the apparatus comprising:
    an elongate shaft having a first end region and a second end region;
    means for manipulating an object affixed relative to the first end region of the elongate shaft, the object manipulation means including a pair of aligned notches on opposing inclined surfaces capable of supporting an object therebetween;
    first means for gripping attached to the second end region of the elongate shaft; and
    second means for gripping attached to the second end region of the elongate shaft.

* * * * *